United States Patent
Olabiyi et al.

(10) Patent No.: US 11,468,239 B2
(45) Date of Patent: Oct. 11, 2022

(54) JOINT INTENT AND ENTITY RECOGNITION USING TRANSFORMER MODELS

(71) Applicant: Capital One Services, LLC, McLean, VA (US)

(72) Inventors: Oluwatobi Olabiyi, Arlington, VA (US); Erik T. Mueller, Chevy Chase, MD (US); Zachary Kulis, Washington, DC (US); Varun Singh, Silver Spring, MD (US)

(73) Assignee: Capital One Services, LLC, McLean, VA (US)

( * ) Notice: Subject to any disclaimer, the term of this patent is extended or adjusted under 35 U.S.C. 154(b) by 117 days.

(21) Appl. No.: 16/881,282

(22) Filed: May 22, 2020

(65) Prior Publication Data

US 2021/0365635 A1    Nov. 25, 2021

(51) Int. Cl.
*G06N 3/08*       (2006.01)
*G06F 40/295*     (2020.01)
(Continued)

(52) U.S. Cl.
CPC ......... *G06F 40/295* (2020.01); *G06F 40/284* (2020.01); *G06K 9/6267* (2013.01); *G06N 3/08* (2013.01)

(58) Field of Classification Search
None
See application file for complete search history.

(56) References Cited

U.S. PATENT DOCUMENTS

2018/0293462 A1    10/2018    Ambati et al.
2019/0236464 A1    8/2019    Feinson et al.
(Continued)

FOREIGN PATENT DOCUMENTS

| CN | 110209822 A | 9/2019 |
| CN | 110222167 A | 9/2019 |
| CN | 110245229 A | 9/2019 |

OTHER PUBLICATIONS

Taku Kudo, Subword Regularization: Improving Neural Network Translation Models with Multiple Subword Candidates, arXiv:1804.10959v1 [cs.CL] Apr. 29, 2018.
(Continued)

*Primary Examiner* — Jialong He
(74) *Attorney, Agent, or Firm* — Banner & Witcoff, Ltd.

(57) ABSTRACT

Systems described herein may use transformer-based machine classifiers to perform a variety of natural language understanding tasks including, but not limited to sentence classification, named entity recognition, sentence similarity, and question answering. The exceptional performance of transformer-based language models is due to their ability to capture long-term temporal dependencies in input sequences. Machine classifiers may be trained using training data sets for multiple tasks, such as but not limited to sentence classification tasks and sequence labeling tasks. Loss masking may be employed in the machine classifier to jointly train the machine classifier on multiple tasks simultaneously. The user of transformer encoders in the machine classifiers, which treat each output sequence independently of other output sequences, in accordance with aspects of the invention do not require joint labeling to model tasks.

20 Claims, 6 Drawing Sheets

(51) Int. Cl.
*G06K 9/62* (2022.01)
*G06F 40/284* (2020.01)

(56) References Cited

U.S. PATENT DOCUMENTS

2019/0266250 A1 8/2019 Toplyn
2020/0402507 A1* 12/2020 Neelakantan ........... G10L 15/22
                                                    704/270.1

OTHER PUBLICATIONS

Jacob Devlin et al, Bert: Pre-training of Deep Bidirectional Transformers for Language Understanding, arXiv:1810.04805v2 [cs.CL] May 24, 2019.

Giuseppe Castellucci et al, Multi-lingual Intent Detection and Slot Filling in a Joint BERT-based Model, arXiv:1907.02884v1 [cs.CL] Jul. 5, 2019.

Vaswani et al "Attention is All You Need" 31st Conference on Neural Information Processing Systems (NIPS 2017), Long Beach, CA, USA, Dec. 6, 2017, pp. 1-15.

Yang et al "XLNet: Generalized Autoregressive Pretraining for Language Understanding", 33rd Conference on Neural Information Processing Systems (NeurIPS 2019), Vancouver, Canada, Jan. 2, 2020, pp. 1-18.

Liu et al "Attention-Based Recurrent Neural Network Models for Joint Intent Detection and Slot Filling", Sep. 6, 2016, pp. 1-5.

Goo et al. "Slot-Gated Modeling for Joint Slot Filling and Intent Prediction", New Orleans, Louisiana, Jun. 1-6, 2018. c 2018 Association for Computational Linguistics, Proceedings of NAACL-HLT 2018, pp. 753-757.

* cited by examiner

JOINT INTENT AND ENTITY RECOGNITION USING TRANSFORMER MODELS

FIELD OF USE

The present disclosure is generally related to machine learning and the training of machine classifiers to handle multiple tasks.

BACKGROUND

Computer generated responses to user input such as dialogue, images, and the like, are often limited in diversity and/or not particularly relevant to the user input. For example, computer generated responses to user input such as dialogue in conventional systems may include phrases such as "I don't know," "I'm sorry," and "I don't know what you are talking about," that are safe, limited in diversity, and not particularly relevant to the topic of the conversation.

While advances in machine learning, especially within deep neural networks, have enabled new capacity for machines to learn behavior from repository human behavioral data, existing neural network architecture and/or methodology continue to produce computer generated responses to user input that are limited in diversity and/or not particularly relevant to the topic of the input data. Aspects described herein may address these and other problems, and generally improve the quality and capabilities of machine classifiers trained to perform multiple tasks.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Systems described herein may use transformer-based machine classifiers to perform a variety of natural language understanding tasks including, but not limited to sentence classification, named entity recognition, sentence similarity, and question answering.

The exceptional performance of transformer-based language models is due to their ability to capture long-term temporal dependencies in input sequences. Machine classifiers may be trained using training data sets for multiple tasks, such as but not limited to sentence classification tasks and sequence labeling tasks. Loss masking may be employed in the machine classifier to jointly train the machine classifier on multiple tasks simultaneously. Existing machine learning architectures, such as recurrent neural networks, typically require training data to be jointly labeled. The user of transformer encoders in the machine classifiers, which treat each output sequence independently of other output sequences, in accordance with aspects of the invention do not require joint labeling to model tasks. Accordingly, transformer-based machine classifiers may be trained to jointly model multiple tasks with a single machine classifier, saving processing time, processing resources, and improving the ability of a computing device to classify multiple tasks.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for training machine classifiers to perform multiple tasks and generating responses. Conventional systems for generating responses in multi-turn dialogs often produce irrelevant or unuseful responses to user input due in part to the criterion for the training and application stages being different. For example, conventional dialogue generation models may be trained with teacher forcing methods where during training, the generator generates the next word in the response by taking the past word from an actual human response (e.g. past input) rather than the past output of the generator. However, during the application stage, the generator may produce irrelevant responses to the user input because it is only able to use its own past input. This phenomenon is often referred to as the exposure bias. To address exposure bias, conventional systems typically use a scheduled sampling technique where the machine learning module is encouraged to use its own past output word as the basis to generate new responses. However, this may easily lead to instabilities. Additionally, conventional systems may also produce responses to user input that are limited in diversity because diversity is often not encouraged during the training stage but expected during the application stage. To address diversity, conventional systems may apply heuristic techniques to the output of a machine learning module. However, this typically does not provide the same quality and quantity of diversity as introducing diversity during the training stage. Additionally, some conventional systems address diversity by using maximum mutual information criteria; however, this still provides limited diversity in generated outputs.

Machine classifiers in accordance with aspects of the disclosure may use transformer-based architectures to perform a variety of natural language understanding tasks including, but not limited to sentence classification, named entity recognition, sentence similarity, and question answering. The exceptional performance of transformer-based language models is due to their ability to capture long-term temporal dependencies in input sequences. Machine classifiers may be trained using training data sets for multiple tasks, such as but not limited to sentence classification tasks and sequence labeling tasks. Loss masking may be employed in the machine classifier to jointly train the machine classifier on multiple tasks simultaneously. Existing machine learning architectures, such as recurrent neural networks, typically require training data to be jointly labeled. The user of transformer encoders in the machine classifiers, which treat each output sequence independently of other output sequences, in accordance with aspects of the invention do not require joint labeling to model tasks. Accordingly, transformer-based machine classifiers may be trained to jointly model multiple tasks with a single machine classifier, saving processing time, processing resources, and improving the ability of a computing device to classify multiple tasks.

Operating Environments and Computing Devices

Figure 1:
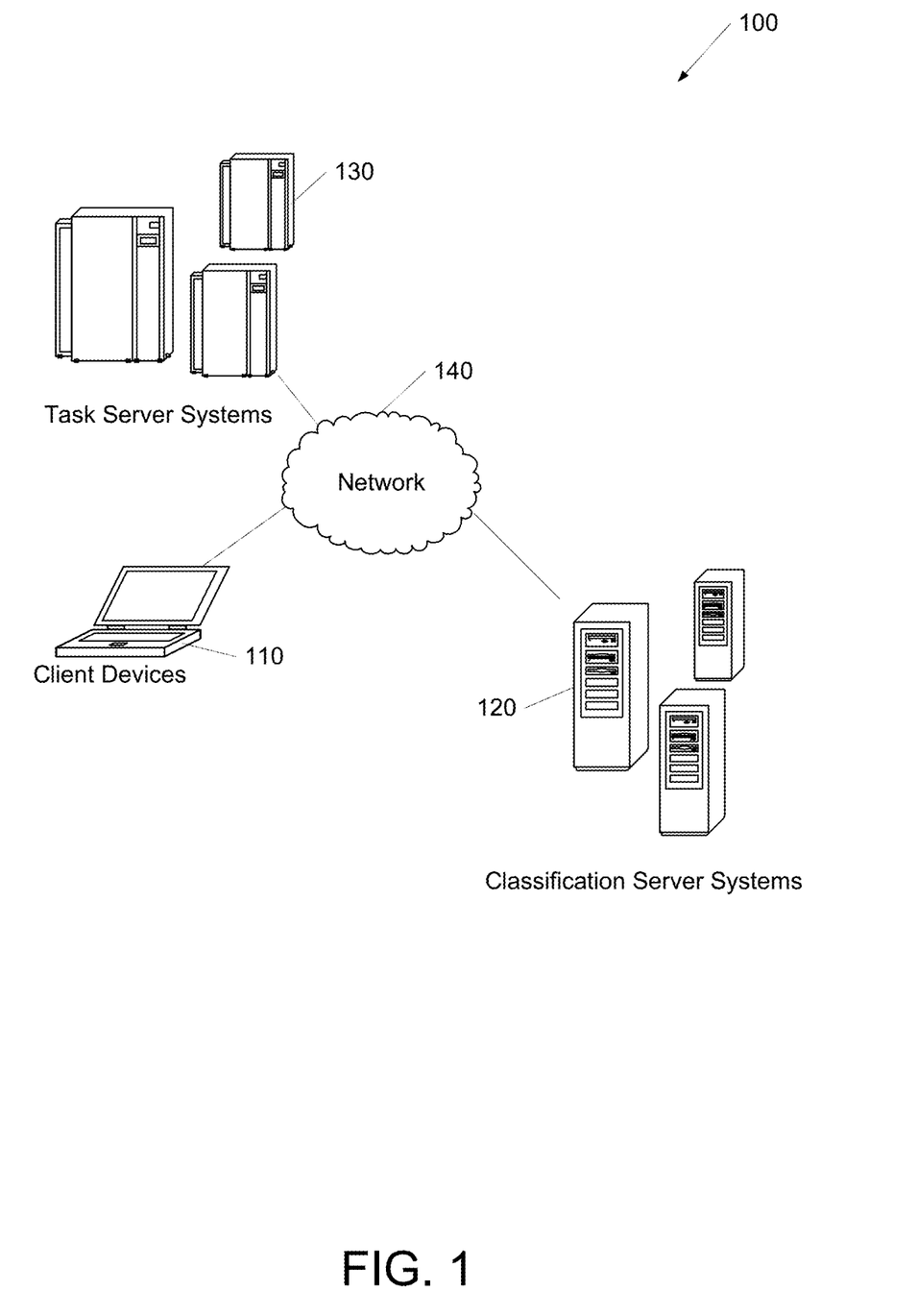
FIG. 1 shows an example of an operating environment in which one or more aspects described herein may be implemented.

FIG. 1 shows an operating environment 100. The operating environment 100 may include at least one client device 110, at least one task server system 130, and/or at least one classification server system 120 in communication via a network 140. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 2.

Client devices 110 may provide data and/or interact with a variety of machine classifiers as described herein. Classification server systems 120 may store, train, and/or provide a variety of machine classifiers as described herein. Task server systems 130 may exchange data with client devices 110, provide training data to the classification server systems 120, provide input data to the classification server systems 120 for classification, and/or obtain classified data from the classification server systems 120 as described herein. However, it should be noted that any computing device in the operating environment 100 may perform any of the processes and/or store any data as described herein. The task server systems 130 and/or classification server systems 120 may be publicly accessible and/or have restricted access. Access to a particular server system may be limited to particular client devices 110. Some or all of the data described herein may be stored using one or more databases. Databases may include, but are not limited to relational databases, hierarchical databases, distributed databases, in-memory databases, flat file databases, XML databases, NoSQL databases, graph databases, and/or a combination thereof. The network 140 may include a local area network (LAN), a wide area network (WAN), a wireless telecommunications network, and/or any other communication network or combination thereof.

The data transferred to and from various computing devices in operating environment 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. A file-based integration scheme or a service-based integration scheme may be utilized for transmitting data between the various computing devices. Data may be transmitted using various network communication protocols. Secure data transmission protocols and/or encryption may be used in file transfers to protect the integrity of the data such as, but not limited to, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the operating environment 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, and/or firewalls. Such specialized hardware may be installed and configured in the operating environment 100 in front of one or more computing devices such that any external devices may communicate directly with the specialized hardware.

Figure 2:
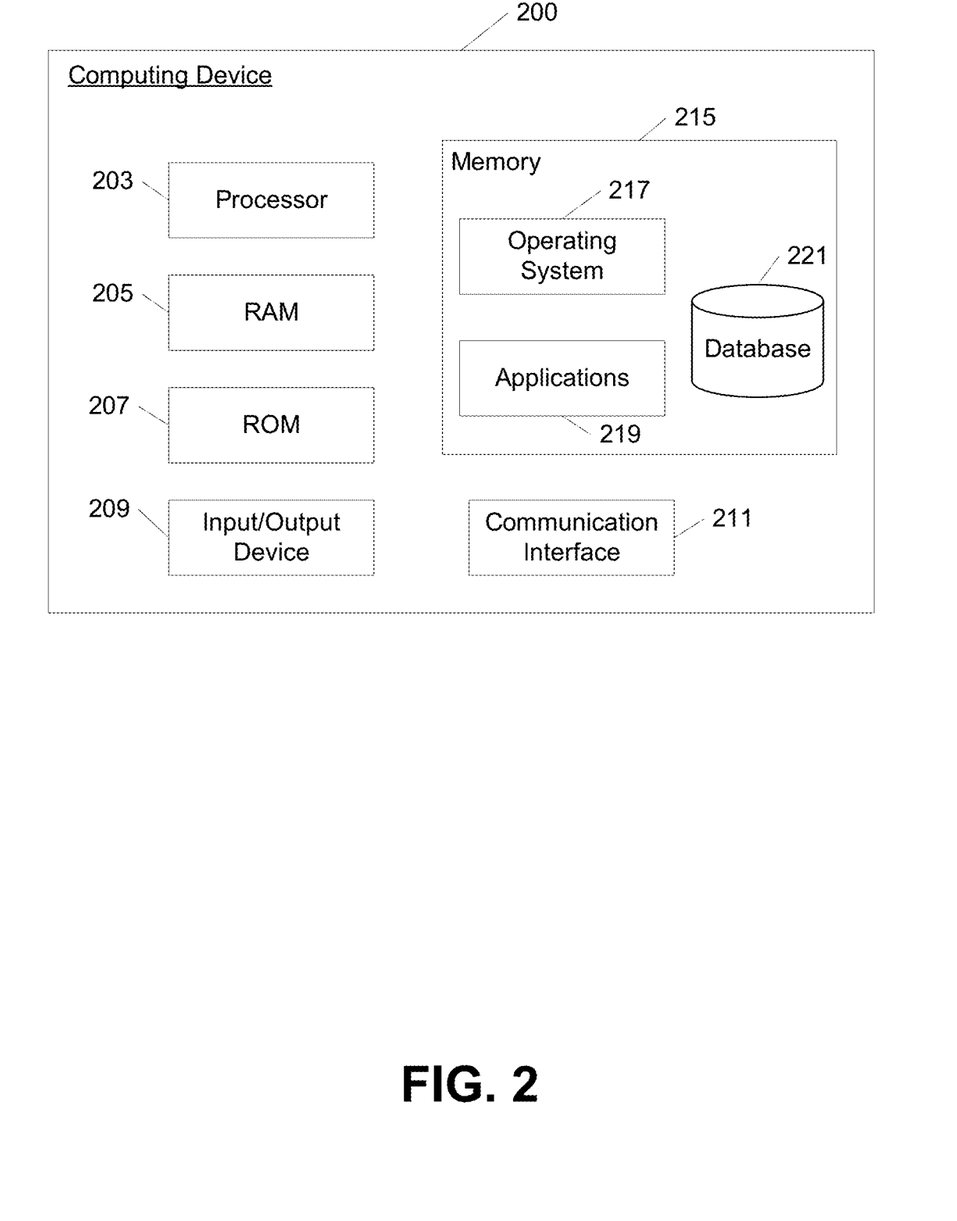
FIG. 2 shows an example computing device in accordance with one or more aspects described herein.

Turning now to FIG. 2, a conceptual illustration of a computing device 200 that may be used to perform any of the techniques as described herein is shown. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. Memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches including, but not limited to, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Any data described and/or transmitted herein may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 200. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 200 in front of one or more computing devices such that any external devices may communicate directly with the specialized hardware.

Machine Classifiers and Processes

Figure 3:
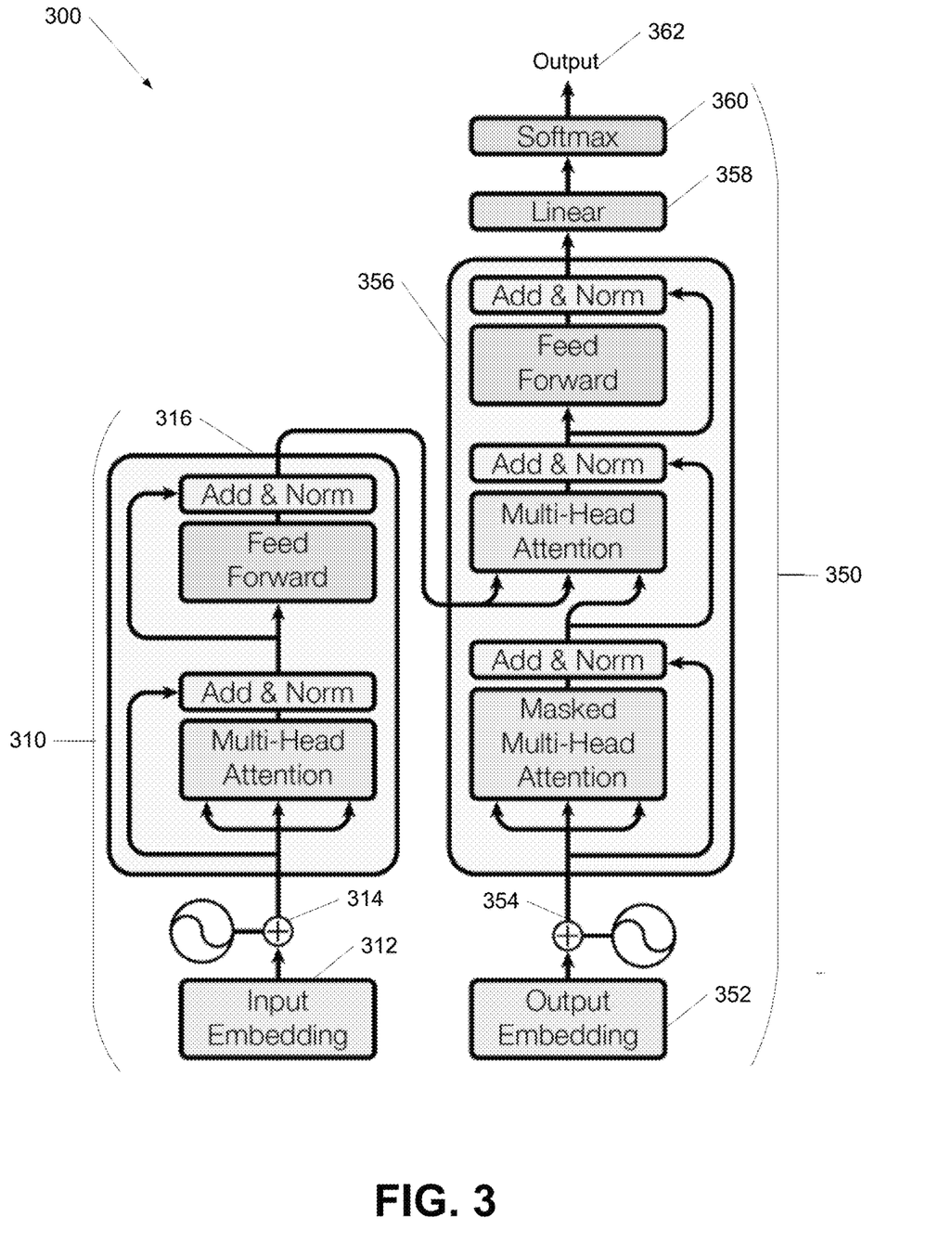
FIG. 3 shows an example of a machine classifier having a transformer architecture in accordance with one or more aspects described herein.

FIG. 3 shows an example of a machine classifier having a transformer architecture in accordance with one or more aspects described herein. The machine classifier 300 includes an encoder 310 and a decoder 350. In a variety of embodiments, the machine classifier 300 may use a sequence-to-sequence architecture that transforms a given input sequence, such as a sentence in a natural language processing task, into an output sequence. In several embodiments, the encoder and/or decoder use a long-short-term memory architecture, which may process the input sequence and/or output sequence while remembering (or forgetting) portions of the sequences that are important and/or unimportant. For example, sentences are typically sequence-dependent since the order of the words is crucial for understanding the meaning of the sentence. However, it should be noted that any machine classifier architectures may be utilized including (but not limited to) decision trees, k-nearest neighbors, support vector machines (SVM), neural networks (NN), recurrent neural networks (RNN), convolutional neural networks (CNN), and/or probabilistic neural networks (PNN). RNNs may further include (but are not limited to) fully recurrent networks, Hopfield networks, Boltzmann machines, self-organizing maps, learning vector quantization, simple recurrent networks, echo state networks, long short-term memory networks, bi-directional RNNs, hierarchical RNNs, stochastic neural networks, and/or genetic scale RNNs. In a number of embodiments, a combination of machine classifiers may be utilized, more specific machine classifiers when available, and general machine classifiers at other times may further increase the accuracy of predictions.

The encoder 310 may take an input sequence 312 and generate an encoded input 314. The encoded input 314 may be a byte-pair encoding as described in more detail with respect to FIG. 5. The byte-pair encoding may include embedding a sequence into an n-dimensional space. The encoded input 314 may then be provided to an input attention layer 316 that processes the encoded input and provides the processed input data to the decoder 350. The decoder 350 may use an encoded output 354, generated based on a decoder input sequence 352, which is fed into an output attention layer 356 that generates one or more elements of an output sequence 362. In several embodiments, the encoding of the output sequence may include shifting the decoder input sequence one position. The generated elements may be processed, such as using a linear transformer 358 and/or softmax function 360 to add metadata, such as a confidence metric, to the generated elements of the output sequence 362. In a variety of embodiments, the decoder 350 generates the output sequence 362 on an element-by-element basis such that the input sequence 312 and decoder input sequence 352 are iteratively processed one element at a time.

An attention layer, such as input attention layer 316 and output attention layer 356, may analyze a sequence and determine one or more elements within the sequence that are important (or unimportant) to understanding the sequence. Analyzing the importance of a sequence may include determining the important elements previously seen in the sequence to provide context to the sequence. For example, when processing a sentence, an attention layer may identify elements within the sequence that provide grammatical semantics to understanding one or more concepts described by the sentence. In several embodiments, the attention layer may indicate the importance of an element by assigning a weight to a particular class of element based on its purpose within the sequence. Any weighting scheme, such as assigning a value between zero and one, or negative one and one, may be used as appropriate. The weighted elements provided by the attention layer may be provided to the decoder to assist the decoder in determining the output sequence based on the identified important elements within the input sequence. Similarly, unimportant elements may be ignored by the decoder so that the decoder avoids generating irrelevant or incorrect output based on the unimportant elements. In several embodiments, the encoder 310 and/or decoder 350 may contain multiple attention layers, 316 and 356 respectively. The attention layers may also include a feed-forward layer, such as a pointwise feed-forward layer. The feed-forward layer may include a feed-forward network with parameters for each position in a sequence. The parameters may be used to define a linear transformation of each element for the given sequence. In several embodiments, the parameters are the same for each element in the sequence.

The encoded sequences may include a variety of vector representations of the sequence being encoded. For example, an encoded sequence may include a vector representation of an element in the sequence, a vector representation of all the categories of elements in the sequence, and a vector representation of all the elements in the sequence. An attention mechanism may take vector representations of sequences and apply the appropriate attention weights to the vector representation of the elements based on the vector representation of the categories associated with the elements in the sequence. The attention mechanism may consider the encoder sequence and/or the decoder sequence as appropriate. In several embodiments, the attention weights are defined by how each element of the sequence, represented by the vector representation of the element in the sequence, is influenced by all the other elements in the sequence, represented by the vector representation of all the elements in the sequence. In several embodiments, a function, such as the softmax function, may be applied to the attention weights to distribute the attention weights between zero and one. Attention layers may include a variety of attention mechanisms, such as a scaled dot product attention mechanism and/or a multi-headed attention mechanism. Scaled dot product attention mechanisms may operate on a single element in a sequence at a time, while a multi-headed attention mechanism may operate on multiple elements in a sequence in parallel. Multi-headed attention mechanisms may also operate on different linear projections of the vector representations in parallel. A linear projection of a vector representation may be determined by multiplying the vector representation by a weight matrix learned during the training of the machine classifier. The weight matrices may be different depending on if the attention mechanism is being used by the encoder, the decoder, or both. An attention mechanism that connects the encoder and decoder may allow the encoder input sequence to be considered together with the current representation of the decoder input sequence during the generation of the output sequence.

Figure 4:
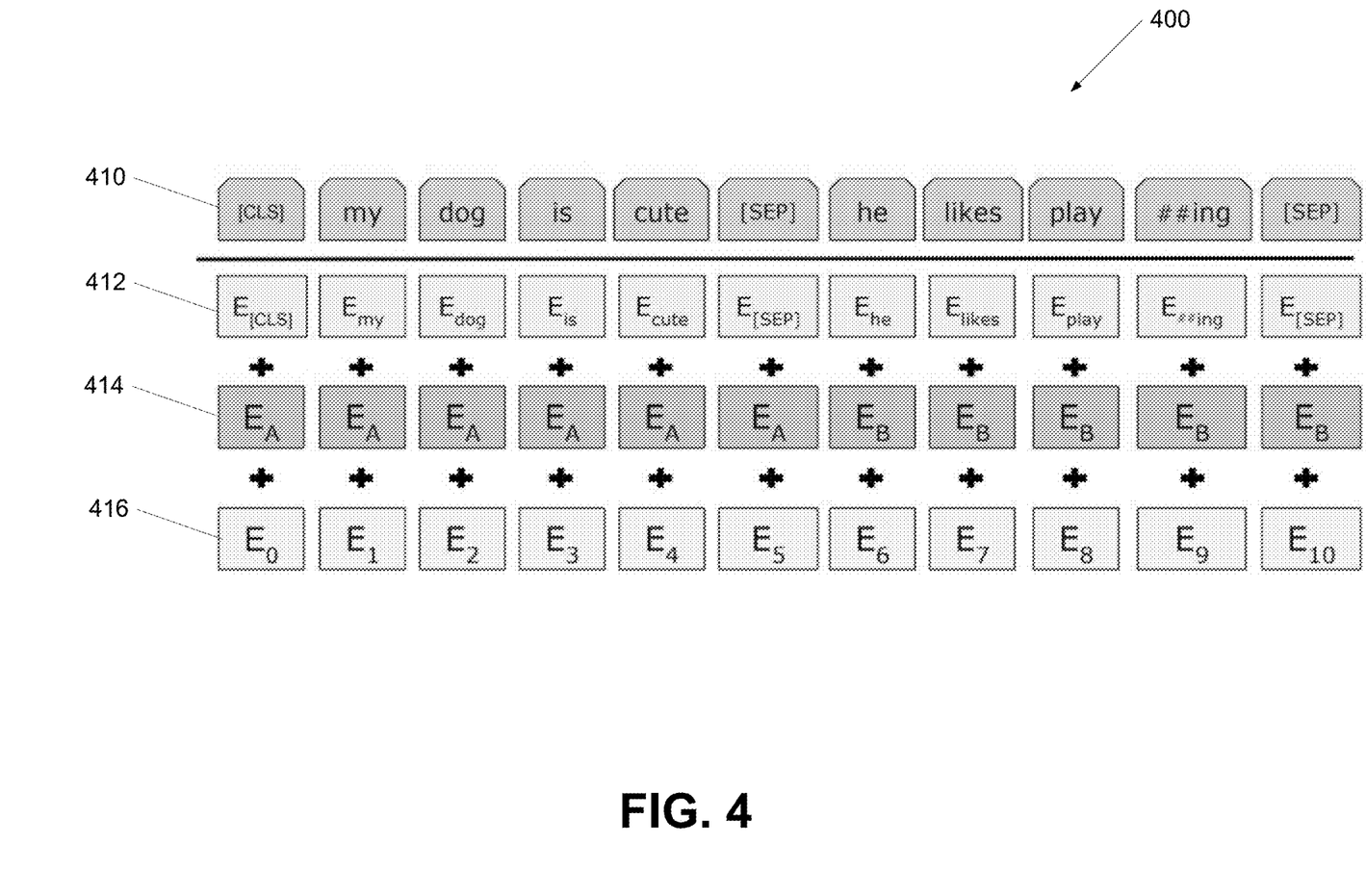
FIG. 4 shows an example of an encoding of input data in accordance with one or more aspects described herein.

FIG. 4 shows an example encoding of input data in accordance with one or more aspects described herein. Encoded input data may include replacing multiple bytes of data with a byte that does not occur within the data. Any of a variety of encodings such as, but not limited to, byte pair encoding, WordPiece encoding, and subword tokenization may be used. Byte pair encoding is a form of data compression in which the most common set of consecutive bytes of data is replaced with a byte that does not occur within that data. A table of the replacement bytes is simultaneously generated such that the table may be used to reconstruct the original data from the compressed data by replacing the replacement bytes with the original bytes in reverse order of the original replacement. WordPiece encoding is a form of data compression in which commonly occurring subword pieces in a particular language are replaced with bytes not occurring within the language. The subword pieces may be determined based on the language and/or the words occurring within the data. The data may also be tokenized into subwords during the compression process. To perform subword tokenization, elements within the data may be broken into frequently occurring subwords. These subwords may then be substituted during the encoding of the data.

The encoded input data 400 includes an input sequence 410, token embeddings 412, segment embeddings 414, and position embeddings 416. In many embodiments, the encoding of the data is the sum of token embeddings 412, the segmentation embeddings 414, and the position embeddings 416. The input sequence 410 may include one or more tokens forming one or more subsequences within the input sequence 410. Each subsequence within the input sequence 410 may be related. For example, a first subsequence may be a statement and the second subsequence may be a response to that statement. The input sequence may begin with a start of sequence token, such as a [CLS] token as shown in encoded input data 400. The input sequence 410 may include multiple subsequences, such as multiple sentences in a dialog model, each subsequence being ended by a separator character. For example, a [SEP] token may be used to indicate the end of a subsequence in the input sequence 410. In several embodiments, a separator token not followed by another token may indicate the end of the input sequence 410. The tokens in the input sequence 410 may be stemmed, such as tokens "play" and "##ing" indicating that the input sequence 410 includes the word "playing" as shown in input sequence 410.

The token embeddings 412 may include an embedding for each token, including any separator tokens such as the start of sequence and separator tokens described herein, in the input sequence 410. The segmentation embeddings 414 may include an indication of, for each token in the input sequence 410, the subsequence in input sequence 410 to which the token belongs. For example, input sequence 410 includes two subsequences: subsequence A ("[CLS] my dog is cute [SEP]") and subsequence B ("he likes play ##ing [SEP]"). In segmentation embedding, those tokens associated with subsequence A are indicated by EA and those tokens associated with subsequence B are indicated by $E_B$. Position embeddings 416 may indicate the order in which each token appears in the input sequence 410. For example, input sequence 410 includes 11 tokens numbered $E_0$ to $E_{11}$.

Figure 5:
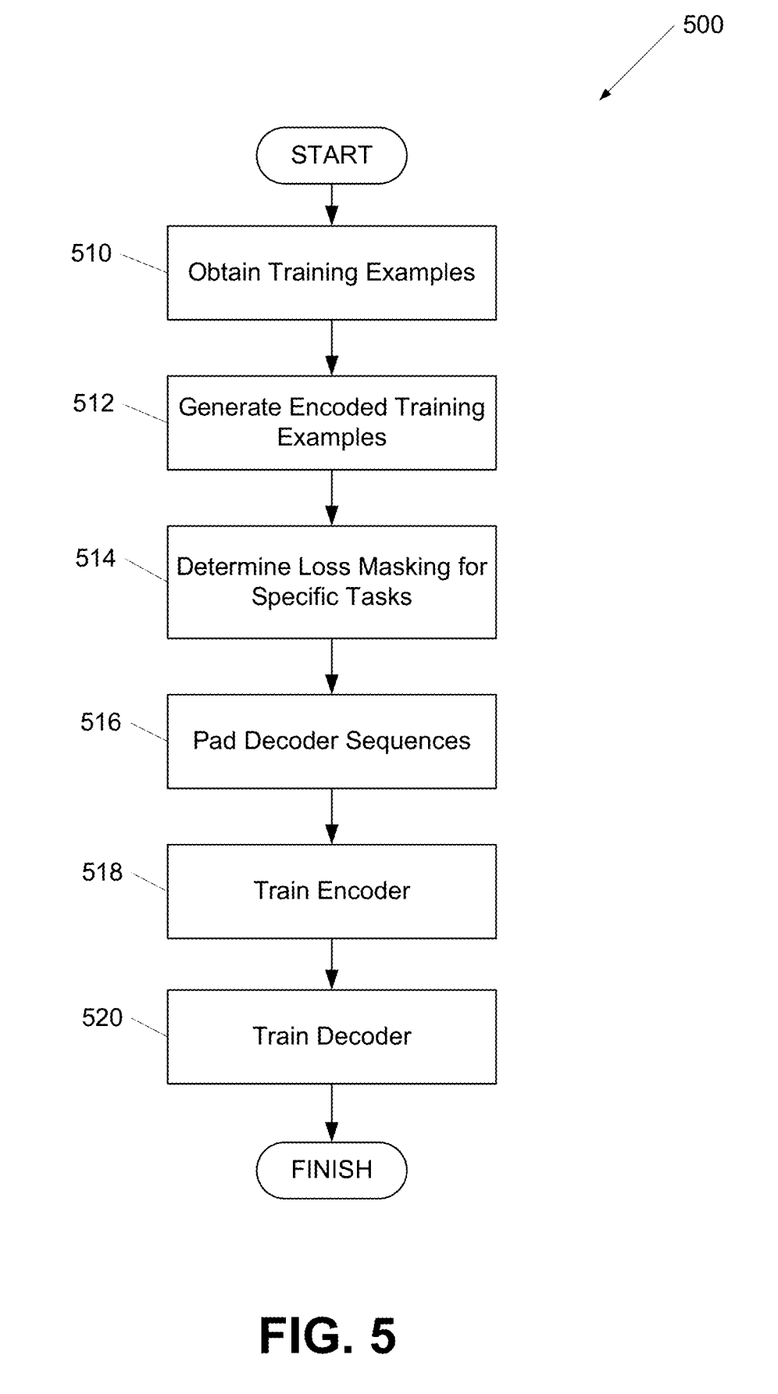
FIG. 5 shows a flow chart of a process for training a machine classifier according to one or more aspects of the disclosure.

FIG. 5 shows a flow chart of a process for training a machine classifier according to one or more aspects of the disclosure. Some or all of the steps of process 500 may be performed using one or more computing devices as described herein. In a variety of embodiments, some or all of the steps described below may be combined and/or divided into sub-steps as appropriate.

At step 510, training examples may be obtained. The training examples may include one or more input sequences. Each input sequence may be associated with a task. The training examples may include input sequences associated with different tasks. Each input sequence may include one or more subsequences. The subsequences may include encoder sequences and/or a decoder sequences that may be provided to an encoder and a decoder, respectively, of a machine classifier during a training process to train the machine classifier to classify data associated with the task. A machine classifier may be trained for each task represented by at least one input sequence in the training examples. An input sequence may include multiple subsequences as described herein.

At step 512, encoded training examples may be generated. Any of a variety of encodings, such as byte pair encodings, WordPiece encodings, subword tokenization, and any other encoding may be utilized as appropriate. Encodings may be generated for each input sequence within the training examples. The encodings may include a token embedding, a segmentation embedding, and a position embedding as described herein. An encoding of a training example may include an indication of a task associated with the input sequence used to generate the encoded training examples.

At step 514, loss making may be determined for specific tasks. Loss masking may be applied to particular input sequences associated with a first task when the machine classifier is being trained on a second task. A loss mask may be a weighting, a flag, or any other indicator that causes the encoder and/or decoder of the machine classifier to ignore particular tokens and/or tokens associated with a particular task. In this way, the machine classifier may be prevented from "seeing" tasks not associated with the second task to prevent the machine classifier from learning classification behaviors that are not relevant for the second task. Similarly, when learning the first task, the input sequences associated with the second task may be masked such that the machine classifier is only trained using input sequences associated with the first task.

At step 516, decoder sequences may be padded. A decoder sequence may be a subsequence within an input sequence that is provided to the decoder portion of a machine learning classifier. An input sequence may include one or more subsequences that are associated with an output to an input subsequence. For example, an input sequence may include a first subsequence that indicates a question and a second subsequence that is a response to the first subsequence. In another example, the input sequence may include a third subsequence that is a response to the second subsequence. In this way, a particular subsequence may be an output subsequence and/or an input subsequence based on the context in which the subsequence is being analyzed. Similarly, the second subsequence may be provided to a decoder as a decoder sequence when the encoder is being trained using the first subsequence, while the second subsequence may be provided to the encoder as an encoder subsequence when the decoder is being trained using the third subsequence as a decoder sequence. Decoder sequences may be padded to shift the tokens in the decoder sequence one or more positions to the right of the corresponding tokens in the corresponding input sequence. Decoder sequences may be shifted to reduce the likelihood that the machine classifier will learn to copy a decoder sequence for a particular input sequence during training of the machine classifier. By padding the decoder sequence for a particular input subsequence (e.g. an encoder sequence that is provided to an encoder of a machine classifier during training), the decoder may learn to generate an output token for a particular input token provided to the encoder. The decoder may learn to predict the target word/character for position i having only seen the word/characters 1, . . . , i−1 in the decoder sequence. In several embodiments, the decoder sequence is padded using a start of sentence token. In a number of embodiments, an end-of-sentence token is appended to the decoder input sequence to mark the end of that sequence.

At step 518, an encoder may be trained. The encoder may be trained for a particular task by providing one or more encoder sequences to the encoder. In several embodiments, an encoder sequence is associated with a loss mask and the encoder ignores encoder sequences that have been masked for the particular task. Training the encoder may include determining a set of attention weights for the tokens within the encoder sequence and providing the encoder sequence and/or attention weights to a decoder. The decoder may be simultaneously trained to decode the input sequence.

At step 520, a decoder may be trained. The decoder may be trained by determining a set of attention weights for a decoder sequence corresponding to the encoder sequence provided to the encoder during the training of the encoder. The attention weights for the decoder sequence may be determined based on the encoder sequence, the decoder sequence, and/or the encoder attention weights as appropriate. In several embodiments, the decoder is provided with the correct decoder data using a teacher forcing process. In many embodiments, the decoder sequence is associated with a loss mask and the decoder ignores decoder sequences that have been masked for the particular task.

The training of the encoder and decoder may continue for each input sequence in the training examples. In this way, the machine classifier may be trained to classify each task described in the training data. Although process 500 is described with respect to the joint training of the encoder and the decoder, it should be noted that a variety of embodiments of the invention separately train the encoder and the decoder. For example, many embodiments of the invention include only training the encoder using one or more encoded input sequences. A number of embodiments of the invention may include only training the decoder using one or more encoded decoder sequences. The decoder sequences may or may not be padded, particularly in those embodiments where only the decoder is being trained. In several embodiments, particularly those where the encoder and decoder are not being jointly trained, the encoder sequence may not be fed from the encoder to the decoder during the training process. That is, the decoder may be trained using a decoder sequence without a corresponding encoder sequence.

Figure 6:
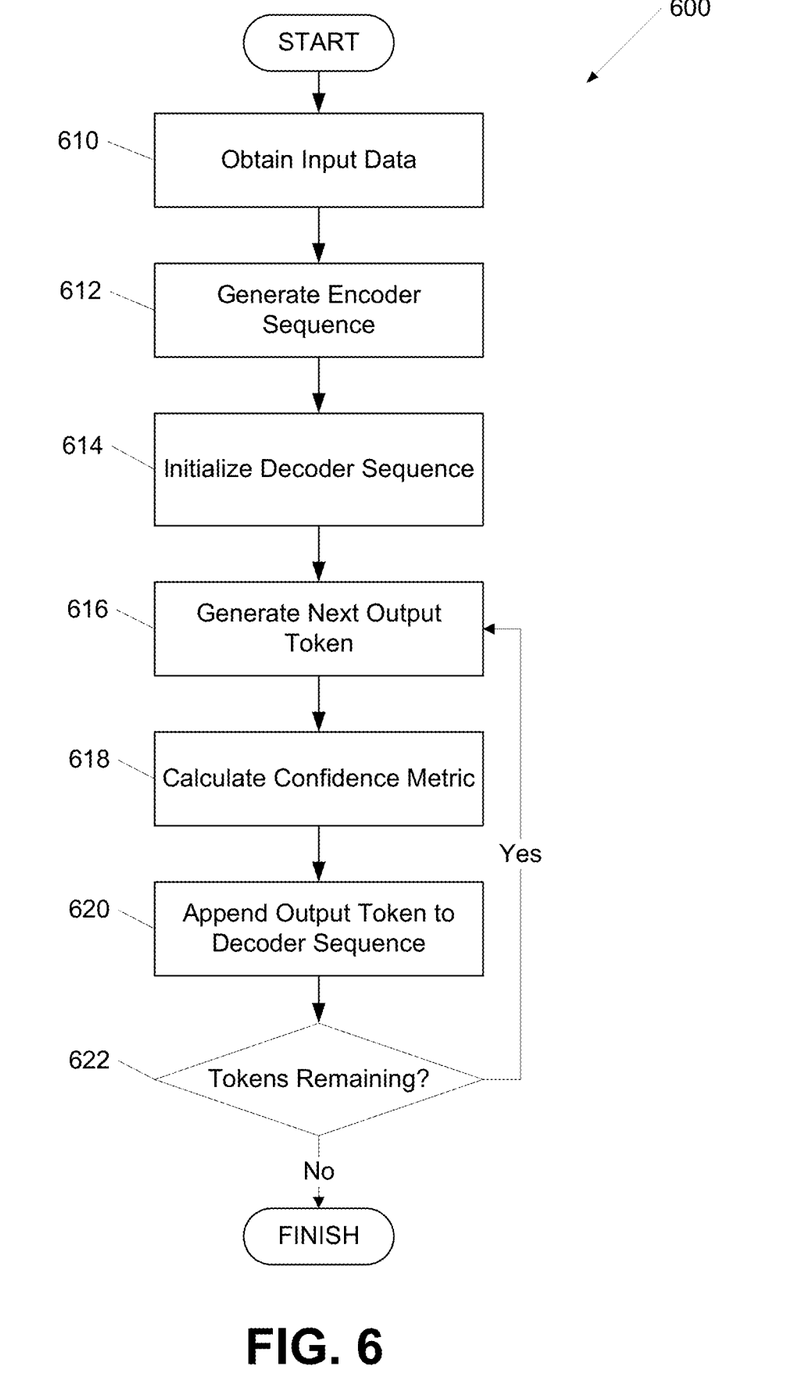
FIG. 6 shows a flow chart of a process for generating an output sequence according to one or more aspects of the disclosure.

FIG. 6 shows a flow chart of a process for generating an output sequence according to one or more aspects of the disclosure. Some or all of the steps of process 600 may be performed using one or more computing devices as described herein. In a variety of embodiments, some or all of the steps described below may be combined and/or divided into sub-steps as appropriate.

At step 610, input data may be obtained. The input data may include an input sequence for which a desired output is to be generated. The input data may include one or more subsequences and each subsequence may include one or more tokens as described herein.

At step 612, an encoder sequence may be generated. The encoder sequence may be generated by encoding the input data. The input data may be encoded into an encoder sequence using any of a variety of encodings as described herein. The encoding may include a token embedding, a segmentation embedding, and a position embedding as described herein.

At step 614, a decoder sequence may be initialized. The initial decoder sequence may include a start of sequence token. In several embodiments, the initial decoder sequence only includes a start of sequence token. However, the initial decoder sequence may include a variety of tokens as appropriate.

At step 616, a next output token may be generated. The next output token may be generated by providing the encoder sequence to the encoder of the machine classifier and the decoder sequence to the decoder of the machine classifier. The decoder may generate the next token for the output sequence based on the encoder sequence, the attention weights for the encoder sequence provided by the encoder, and the tokens currently present in the output sequence.

At step 618, a confidence metric may be calculated. The confidence metric may be calculated based on the likelihood that the decoder has generated a correct token based on the encoder sequence and/or the decoder sequence currently generated. The likelihood of correctness may be based on the training of the encoder and/or decoder as described herein. In a variety of embodiments, the attention weights associated with the encoder sequence and/or decoder sequence may be used to calculate the confidence metric.

At step 622, the next output token and associated confidence metric may be included in the decoder sequence. In many embodiments, the next output token is appended to the decoder sequence. However, the next output token may be placed anywhere in the decoder sequence as appropriate.

At step 622, the number of remaining tokens in the encoder sequence may be determined. When additional tokens are present in the encoder sequence, process 600 may return to step 616 for processing the next token present in the encoder sequence. When no more tokens remain in the encoder sequence, process 600 may finish. In several embodiments, the end of the encoder sequence may be indicated by an end of sequence token. In a variety of embodiments, when no more tokens are present in the encoder sequence, an end of sequence token is appended to the decoder sequence. The decoder sequence may be provided to a variety of systems as the output of the classification of the input data.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method, comprising:
   initializing a model having a sequence-to-sequence network architecture, wherein the sequence-to-sequence network architecture comprises:
   an encoder; and
   a decoder;
   training, based on a training set, the model for a first task and for a second task, the training set comprising a plurality of encoder sequences and a plurality of decoder sequences, a portion of the plurality of encoder sequences having an encoder sequence label and a portion of the plurality of decoder sequences having a decoder sequence label, wherein each of the encoder sequences and decoder sequences include one or more elements and relationships between the one or more elements and a plurality of categories, and wherein training the model comprises:
   generating, for each element, a vector representation identifying relationships between each element and the plurality of categories;

generating, based on the vector representation of each element in each sequence, an encoding of each encoder sequence in the training set, each encoding comprising an encoder attention weight calculated based on the encoder sequence label corresponding to the encoder sequence, wherein an encoding for an encoder sequence not having a corresponding encoder sequence label comprises an encoder attention weight of zero, and wherein the encoder attention weight is further calculated based on a feed-forward analysis using a position of each element in the encoder sequence;

generating an encoding of each decoder sequence in the training set, each encoding comprising a decoder attention weight calculated based on the decoder sequence label corresponding to the decoder sequence, wherein an encoding for a decoder sequence not having a corresponding decoder sequence label comprises a decoder attention weight of zero, and wherein the decoder attention weight is further calculated based on one of the encoder attention weight or based on a feed-forward analysis using a position of each element in the encoder sequence or the decoder sequence;

prepending a start of sequence token to each of the encodings of the decoder sequences;

appending an end of sequence token to each of the encodings of the decoder sequences;

applying, for the first task or the second task, loss masking to:
the encoder sequences; and
the decoder sequences;

for each encoding of the encoder sequences, training the encoder using:
the encoding of the encoder sequence;
the encoder attention weight; and
the loss masking of the first task or the loss masking of the second task; and for each encoding of the decoder sequences, training the decoder using:
the encoding of the decoder sequences;
the decoder attention weight; and
the loss masking of the first task or the loss masking of the second task; and generating, using the trained model having been trained for the first task and for the second task, a prediction based on an input data set.

2. The computer-implemented method of claim 1, wherein generating the encoding of the encoder sequence further comprises appending a separator token to the encoding of the encoder sequence.

3. The computer-implemented method of claim 1, wherein generating the prediction based on the input data further comprises calculating a confidence metric indicating a likelihood that the generated prediction is correct.

4. The computer-implemented method of claim 1, wherein training the encoder comprises skipping any encoder sequence that has been masked.

5. The computer-implemented method of claim 1, wherein training the decoder comprises skipping any decoder sequence that has been masked.

6. The computer-implemented method of claim 1, wherein the encoding of a sample comprises a vector representation of the sample.

7. The computer-implemented method of claim 1, wherein generating the prediction comprises:
generating an input encoding of the input data;
generating an output sequence comprising a start of sequence token; and
completing the output sequence by:
generating a next output sequence token by providing the input encoding to the trained model;
appending the next output sequence token to the output sequence;
iteratively generating next output sequence tokens by providing the input encoding to the trained model and appending each generated next output sequence token to the output sequence until the generated subsequent next output sequence token comprises an end of sequence token; and
generating the prediction based on the output sequence.

8. The computer-implemented method of claim 1, wherein the encoder sequences comprise a set of dialog intents.

9. The computer-implemented method of claim 1, wherein the decoder sequences comprise a set of dialog entities.

10. The computer-implemented method of claim 1, wherein:
the training set comprises a vocabulary; and
the encoding for a sample comprises one hundred percent coverage for the vocabulary.

11. The computer-implemented method of claim 1, wherein the trained model is configured to generate intent labels for a named entity.

12. A computing device, comprising:
a processor; and
a memory in communication with the processor and storing instructions that, when executed by the processor, cause the computing device to:
initialize a model having a sequence-to-sequence network architecture, wherein the sequence-to-sequence network architecture comprises:
an encoder; and
a decoder;
train, based on a training set, the model for a first task and for a second task, the training set comprising a plurality of encoder sequences and a plurality of decoder sequences, a portion of the plurality of encoder sequences having an encoder sequence label and a portion of the plurality of decoder sequences having a decoder sequence label, wherein each of the encoder sequences and decoder sequences include one or more elements and relationships between the one or more elements and a plurality of categories, and wherein training the model comprises:
generating, for each element, a vector representation identifying relationships between each element and the plurality of categories;
generating, based on the vector representation of each element in each sequence, an encoding of each encoder sequence in the training set, each encoding comprising an encoder attention weight calculated based on the encoder sequence label corresponding to the encoder sequence and, when no encoder sequence label corresponds to the encoder sequence, setting the encoder attention weight to zero, and wherein the encoder attention weight is further calculated based on a feed-forward analysis using a position of each element in the encoder sequence;
generating an encoding of each decoder sequence in the training set, each encoding comprising a decoder attention weight calculated based on the decoder sequence label corresponding to the decoder sequence and, when no decoder sequence label corresponds to the decoder sequence, setting the decoder attention weight to zero, and wherein the decoder attention weight is further calculated based on one of the encoder attention weight or based on a feed-forward analysis using a position of each element in the encoder sequence or the decoder sequence;

prepending a start of sequence token to each of the encodings of the decoder sequences;

appending an end of sequence token to each of the encodings of the decoder sequences;

applying, for the first task or the second task, loss masking to:
　the encoder sequences; and
　the decoder sequences;

for each encoding of the encoder sequences, training the encoder using:
　the encoding of the encoder;
　the encoder attention weight; and
　the loss masking of the first task or the loss masking of the second task; and for each encoding of the decoder sequences, training the decoder using:
　the encoding of the decoder sequences;
　the decoder attention weight; and
　the loss masking of the first task or the loss masking of the second task;

generate, using the trained model having been trained for the first task and the second task, a prediction based on an input data set; and calculate a confidence metric indicating a likelihood that the generated prediction is correct.

13. The computing device of claim 12, wherein training the encoder comprises skipping any encoder sequence that has been masked.

14. The computing device of claim 12, wherein training the decoder comprises skipping any decoder sequence that has been masked.

15. The computing device of claim 12, wherein the encoding of a sample comprises a vector representation of the sample.

16. The computing device of claim 12, wherein generating the prediction comprises:
　generating an input encoding of the input data;
　generating an output sequence comprising a start of sequence token; and
　completing the output sequence by:
　　generating a next output sequence token by providing the input encoding to the trained model;
　　appending the next output sequence token to the output sequence;
　　iteratively generating next output sequence tokens by providing the input encoding to the trained model and appending each generated next output sequence token to the output sequence until the generated subsequent next output sequence token comprises an end of sequence token; and
　　generating the prediction based on the output sequence.

17. The computing device of claim 12, wherein the encoder sequences comprise a set of dialog intents.

18. The computing device of claim 12, wherein the decoder sequences comprise a set of dialog entities.

19. A computer-implemented method, comprising:
initializing a model having a sequence-to-sequence network architecture, wherein the sequence-to-sequence network architecture comprises:
　an encoder; and
　a decoder;
training, based on a training set, the model for a first task and for a second task, the training set comprising a plurality of encoder sequences and a plurality of decoder sequences, a portion of the plurality of encoder sequences having an encoder sequence label and a portion of the plurality of decoder sequences having a decoder sequence label, wherein each of the encoder sequences and decoder sequences include one or more elements and relationships between the one or more elements and a plurality of categories, and wherein training the model comprises:
　generating, for each element, a vector representation identifying relationships between each element and the plurality of categories;
　generating, based on the vector representation of each element in each sequence, an encoding of each encoder sequence in the training set, each encoding comprising an encoder attention weight calculated based on the encoder sequence label corresponding to the encoder sequence and, when no encoder sequence label corresponds to the encoder sequence, setting the encoder attention weight to zero, and wherein the encoder attention weight is further calculated based on a feed-forward analysis using a position of each element in the encoder sequence;
　generating an encoding of each decoder sequence in the training set, each encoding comprising a decoder attention weight calculated based on the decoder sequence label corresponding to the decoder sequence and, when no decoder sequence label corresponds to the decoder sequence, setting the decoder attention weight to zero, and wherein the decoder attention weight is further calculated based on one of the encoder attention weight or based on a feed-forward analysis using a position of each element in the encoder sequence or the decoder sequence;
　prepending a start of sequence token to each of the encodings of the decoder sequences;
　appending an end of sequence token to each of the encodings of the decoder sequences;
　applying, for the first task or the second task, loss masking to:
　　the encoder sequences; and
　　the decoder sequences;
　for each encoding of the encoder sequences, training the encoder using:
　　the encoding of the encoder sequence;
　　the encoder attention weight; and
　　the loss masking of the first task or the loss masking of the second task; and
　for each encoding of the decoder sequences, training the decoder using:
　　the encoding of the decoder sequences;
　　the decoder attention weight; and
　　the loss masking of the first task or the loss masking of the second task;
generating, using the trained model having been trained for the first task and for the second task, a prediction based on an input data set by:

generating an input encoding of the input data;
generating an output sequence comprising a start of sequence token;
completing the output sequence by:
   generating a next output sequence token by providing the input encoding to the trained model;
   appending the next output sequence token to the output sequence; and
   iteratively generating next output sequence tokens by providing the input encoding to the trained model and appending each generated next output sequence token to the output sequence until the generated subsequent next output sequence token comprises an end of sequence token; and
generating the prediction based on the output sequence; and
calculating a confidence metric indicating a likelihood that the generated prediction is correct.

20. The computer-implemented method of claim 19, wherein:
the training set comprises a vocabulary; and
the encoding for a sample comprises one hundred percent coverage for the vocabulary.

\* \* \* \* \*